(12) United States Patent
Suciu et al.

(10) Patent No.: US 10,934,938 B2
(45) Date of Patent: Mar. 2, 2021

(54) BOUNDARY LAYER COOLING AIR FOR EMBEDDED ENGINE

(71) Applicant: UNITED TECHNOLOGIES CORPORATION, Farmington, CT (US)

(72) Inventors: Gabriel L. Suciu, Glastonbury, CT (US); Wesley K. Lord, South Glastonbury, CT (US); Jesse M. Chandler, South Windsor, CT (US); Steven H. Zysman, Amston, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 672 days.

(21) Appl. No.: 15/217,108

(22) Filed: Jul. 22, 2016

(65) Prior Publication Data
US 2018/0023474 A1    Jan. 25, 2018

(51) Int. Cl.
| | | |
|---|---|---|
| *F02C 7/18* | (2006.01) | |
| *B64D 27/20* | (2006.01) | |
| *F02C 3/04* | (2006.01) | |

(52) U.S. Cl.
CPC ............... *F02C 7/18* (2013.01); *B64D 27/20* (2013.01); *F02C 3/04* (2013.01); *F05D 2220/323* (2013.01); *F05D 2250/51* (2013.01); *F05D 2260/232* (2013.01); *Y02T 50/676* (2013.01)

(58) Field of Classification Search
CPC ............................................. B64D 2033/0226
See application file for complete search history.

(56) References Cited

U.S. PATENT DOCUMENTS

| | | | |
|---|---|---|---|
| 5,357,742 A * | 10/1994 | Miller | B64D 33/08 244/53 B |
| 6,202,403 B1 * | 3/2001 | Laborie | B64D 33/08 60/39.83 |
| 7,721,260 B2 | 5/2010 | Short et al. | |
| 8,365,514 B1 | 2/2013 | Kupratis | |
| 9,359,085 B2 | 6/2016 | Folch Cortes et al. | |
| 2005/0252193 A1 | 11/2005 | Iya et al. | |
| 2006/0242941 A1 | 11/2006 | Johnson | |
| 2009/0000305 A1 | 1/2009 | Porte et al. | |
| 2011/0163207 A1 * | 7/2011 | Chanez | B64C 1/0009 244/53 B |
| 2011/0277483 A1 | 11/2011 | Khalid | |
| 2014/0208714 A1 | 7/2014 | Jones et al. | |
| 2014/0263824 A1 * | 9/2014 | Pesyna | B64D 41/00 244/58 |

OTHER PUBLICATIONS

European Search Report for European Application No. 17182673.8 dated Nov. 30, 2017.

* cited by examiner

*Primary Examiner* — Craig Kim
*Assistant Examiner* — Alyson Joan Harrington
(74) *Attorney, Agent, or Firm* — Carlson, Gaskey & Olds, P.C.

(57) ABSTRACT

A gas turbine engine has an inner housing surrounding a compressor, a combustor, and a turbine, with an inlet leading into the compressor, and a cooling sleeve defined radially outwardly of the inlet to the compressor for receiving cooling air radially outward of the compressor inlet. The cooling sleeve extends along a length of the engine, and radially outwardly of the inner housing, with the cooling air in the cooling sleeve being ejected at a downstream end to mix with products of combustion downstream of the turbine. An aircraft is also disclosed.

4 Claims, 3 Drawing Sheets

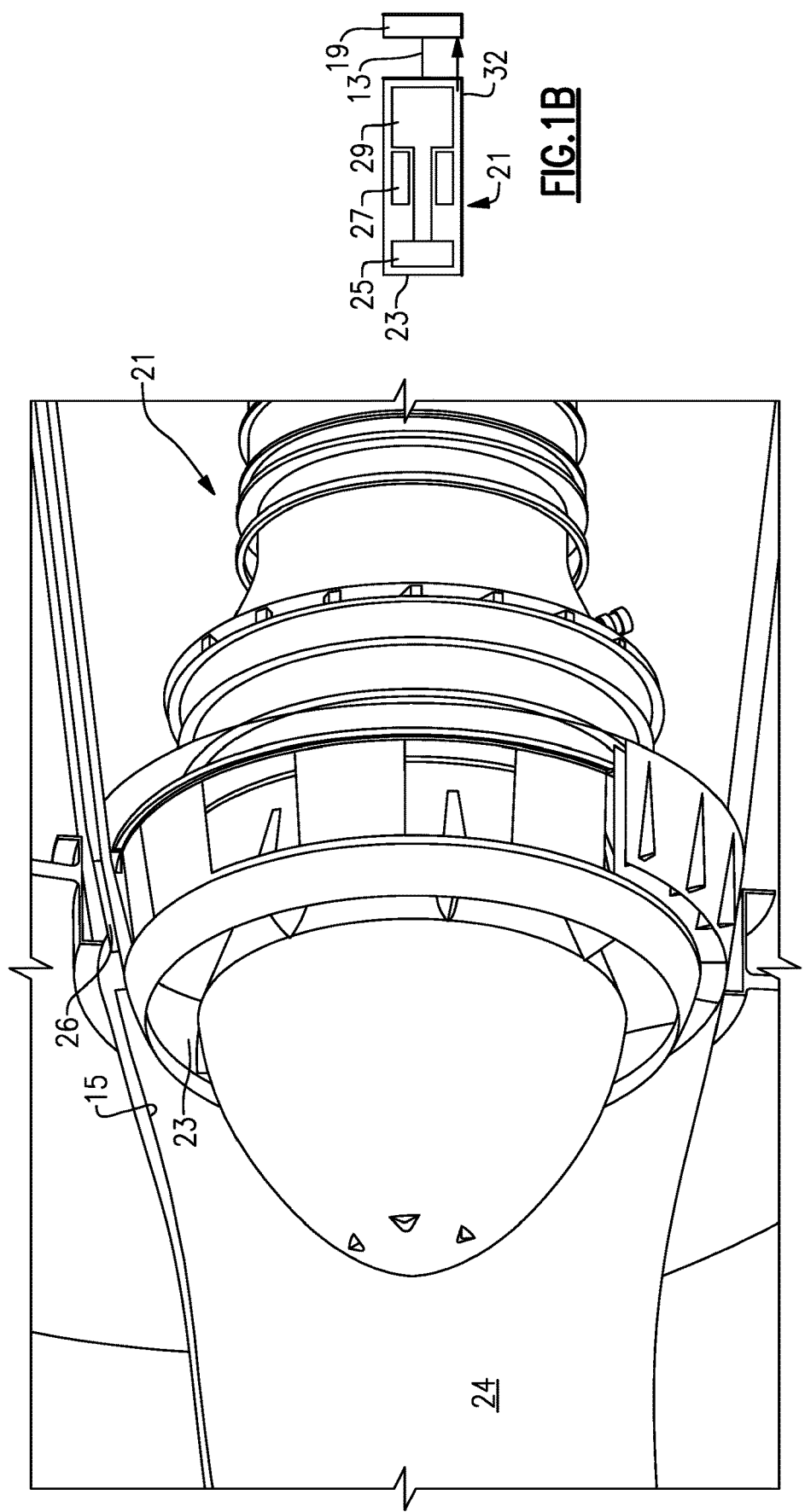

BOUNDARY LAYER COOLING AIR FOR EMBEDDED ENGINE

STATEMENT REGARDING FEDERALLY SPONSORED RESEARCH OR DEVELOPMENT

This invention was made with government support under Contract No. NND15AC56C, awarded by NASA. The Government has certain rights in this invention.

BACKGROUND OF THE INVENTION

This application relates to a gas turbine engine which utilizes boundary layer air as cooling air.

Gas turbine engines are known and, typically, utilized to drive aircraft. As known, air approaches a gas turbine engine and enters a compressor where it is compressed and then delivered into a combustor. The compressed air is mixed with fuel and ignited, and products of that combustion pass downstream over turbine rotors driving them to rotate. The turbine rotors, in turn, rotate compressor rotors.

Modern aircraft are being designed with unique engine mount locations. One such location proposes to imbed an engine within the fuselage of an aircraft.

In one proposed location, there is a long inlet duct leading to the engine. A significant boundary layer may build up within the inlet duct and approaching the engine.

SUMMARY OF THE INVENTION

In a featured embodiment, a gas turbine engine has an inner housing surrounding a compressor, a combustor, and a turbine, with an inlet leading into the compressor, and a cooling sleeve defined radially outwardly of the inlet to the compressor for receiving cooling air radially outward of the compressor inlet. The cooling sleeve extends along a length of the engine, and radially outwardly of the inner housing, with the cooling air in the cooling sleeve being ejected at a downstream end to mix with products of combustion downstream of the turbine.

In another embodiment according to the previous embodiment, the mixed air drives a propulsor turbine for driving a propulsor positioned downstream of the turbine.

In another embodiment according to any of the previous embodiments, the propulsor turbine is a tip turbine, with turbine blades being formed at an outer periphery of the propulsor, to be driven to rotate by the products of combustion and, in turn, rotate the propulsor.

In another embodiment according to any of the previous embodiments, the turbine drives a propulsor through a shaft.

In another embodiment according to any of the previous embodiments, the cooling air in the cooling sleeve provides cooling air to at least one component in a chamber positioned radially between a radially outer surface on the inner housing and a radially inner surface of the cooling sleeve.

In another embodiment according to any of the previous embodiments, the chamber receives cooling air from the cooling sleeve directed into the chamber through at least one conduit.

In another embodiment according to any of the previous embodiments, an elongated inlet duct delivers air into the compressor inlet, and further delivers boundary layer air into the cooling sleeve inlet.

In another embodiment according to any of the previous embodiments, the cooling air in the cooling sleeve provides cooling air to at least one component in a chamber positioned radially between a radially outer surface on the inner housing and a radially inner surface of the cooling sleeve.

In another embodiment according to any of the previous embodiments, the chamber receives cooling air from the cooling sleeve directed into the chamber through at least one conduit.

In another embodiment according to any of the previous embodiments, an elongated inlet duct delivers air into the compressor inlet, and further delivers boundary layer air into the cooling sleeve inlet.

In another featured embodiment, an aircraft has an aircraft fuselage, and a gas turbine engine embedded in the fuselage, an inner housing surrounding a compressor, a combustor, and a turbine, with an inlet leading into the compressor, and a cooling sleeve defined radially outwardly of the inlet to the compressor, for receiving cooling air radially outward of the compressor inlet. The cooling sleeve extends along a length of the engine, and radially outwardly of the inner housing, with the cooling air in the cooling sleeve being ejected at a downstream end to mix with products of combustion downstream of the turbine.

In another embodiment according to the previous embodiment, the mixed air drives a propulsor turbine for driving a propulsor positioned downstream of the turbine.

In another embodiment according to any of the previous embodiments, the propulsor turbine is a tip turbine, with turbine blades being formed at an outer periphery of the propulsor, to be driven to rotate by the products of combustion and, in turn, rotate the propulsor.

In another embodiment according to any of the previous embodiments, the turbine drives a propulsor through a shaft.

In another embodiment according to any of the previous embodiments, the cooling air in the cooling sleeve provides cooling air to at least one component in a chamber positioned radially between a radially outer surface on the inner housing and a radially inner surface of the cooling sleeve.

In another embodiment according to any of the previous embodiments, the chamber receives cooling air from the cooling sleeve directed into the chamber through at least one conduit.

In another embodiment according to any of the previous embodiments, an elongated inlet duct delivers air into the compressor inlet, and further delivers boundary layer air into the cooling sleeve inlet.

In another embodiment according to any of the previous embodiments, the cooling air in the cooling sleeve provides cooling air to at least one component in a chamber positioned radially between a radially outer surface on the inner housing and a radially inner surface of the cooling sleeve.

In another embodiment according to any of the previous embodiments, the chamber receives cooling air from the cooling sleeve directed into the chamber through at least one conduit.

In another embodiment according to any of the previous embodiments, an elongated inlet duct delivers air into the compressor inlet, and further delivers boundary layer air into the cooling sleeve inlet.

These and other features may be best understood from the following drawings and specification.

BRIEF DESCRIPTION OF THE DRAWINGS

FIG. 1B schematically shows an engine and propulsor arrangement.

FIG. 2A shows a detail of the engine.

DETAILED DESCRIPTION

Figure 1A:
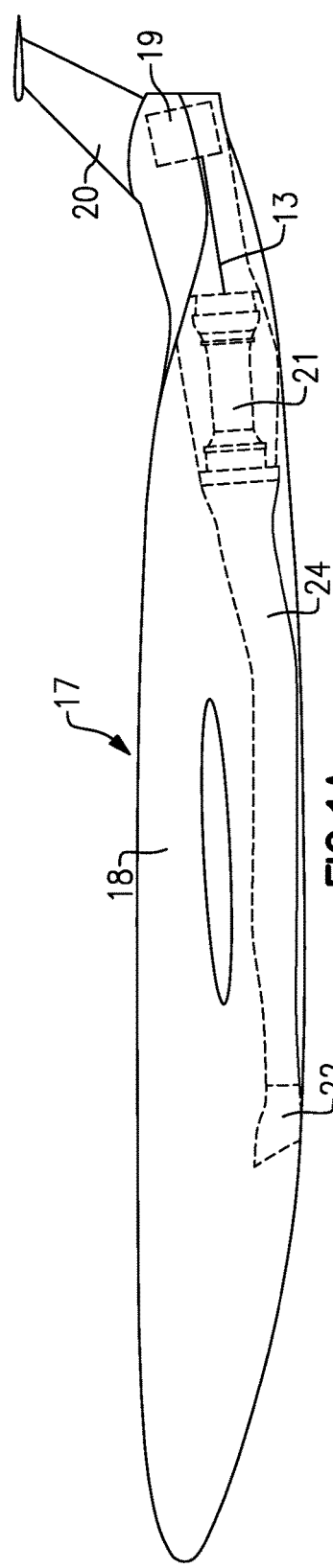
FIG. 1A schematically shows an aircraft with an embedded engine.

FIG. 1A shows an aircraft 17 having a fuselage 18. A propulsor 19 is mounted within a tail 20 and is driven by an engine 21 through shaft 13, as will be explained below. Engine 21 is embedded within the fuselage 18. An inlet 22 delivers air into an inlet duct 24 which takes the air to an inlet for the engine 21.

FIG. 1B schematically shows the engine 21. As shown, an inlet 23 into the engine delivers air to a compressor 25. The air is then delivered into a combustor 27 and mixed with fuel and ignited. Products of this combustion pass downstream over a turbine rotor 29 driving it to rotate. The turbine rotor, in turn, drives the compressor rotor. Of course, this view is extremely schematic, and many other components may be included.

The turbine rotor drives the propulsor 19 to rotate through shaft 13. The propulsor may be a large fan, and its output provides propulsion for aircraft 17. While a single spool is shown, a two-spool engine may be used.

FIG. 2A shows details of the engine 21 and the inlet duct 24. As shown, the radially outer air within the inlet duct 24 enters into a boundary layer inlet 26. As understood, there would be a boundary layer of air adjacent the inner surface 15 of the inlet duct, and that air is directed away from the inlet 23 leading to the compressor.

Figure 2B:
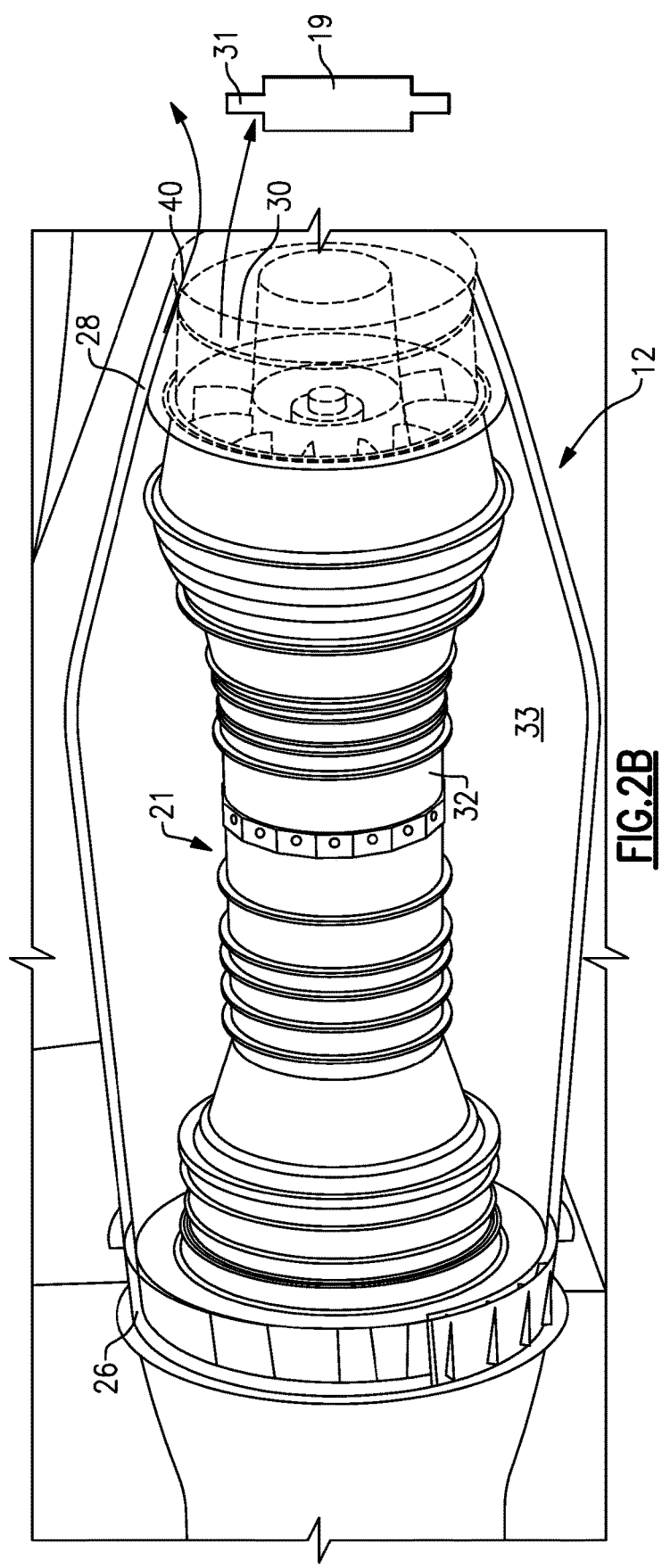
FIG. 2B shows another detail.

FIG. 2B shows an embodiment 12 where the air entering the boundary layer inlet passes into a cooling sleeve chamber 28 that extends generally along the entire length of the engine 21 to an outlet 40. At outlet 40, air from an exhaust 30 passes downstream to pass over a tip turbine having blades 31 driving the propulsor 19. Of course, the propulsor 19 is shown quite schematically and it would include mounting structure and flow structure to deliver air as propulsion air to the propulsor 19. While a tip turbine is disclosed, other turbine types could be used.

In such an embodiment, the cooling air may be diverted away from the gases driving the turbine.

The boundary layer air, being tapped away from the engine, thus, does not raise concerns with regard to the efficient operation of the engine. Instead, the boundary layer air is not only directed away from the engine, but it provides a cooling function which increases the efficiency of the overall engine.

Figure 3:
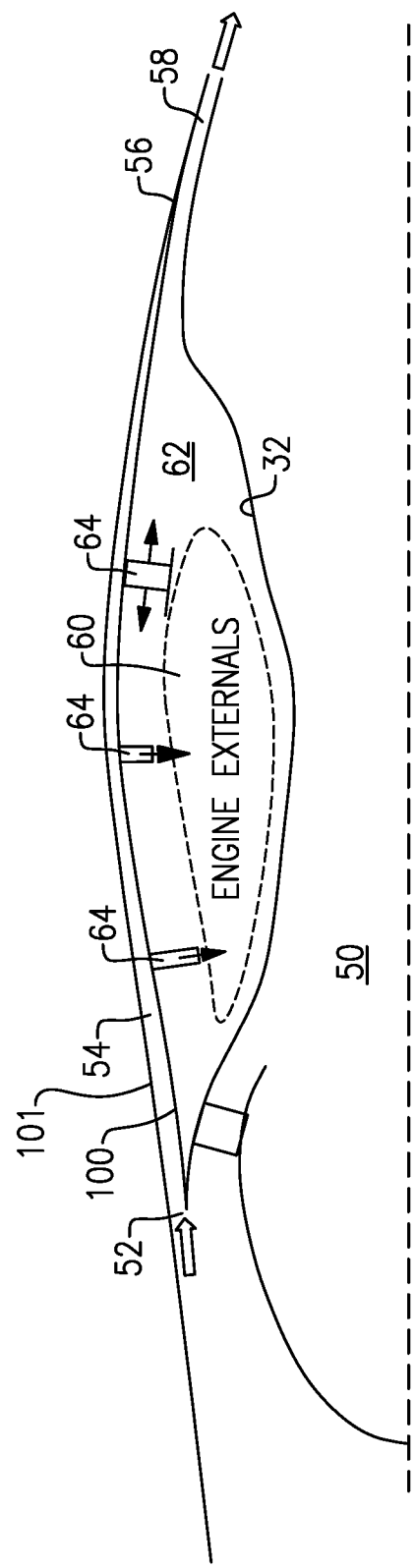
FIG. 3 shows a second embodiment.

FIG. 3 shows an embodiment 50 wherein the inlet 52 into the cooling sleeve chamber 54 passes downstream, however, the downstream end 56 is closed off. Cooling sleeve chamber 54 is defined between a sleeve radially inner wall 100 and a sleeve radially outer wall 101. Instead, there are engine externals, such as engine accessories, mounted within a chamber 62. This chamber 62 desirably receives air which is changed periodically. In this embodiment, inlet conduits 64 deliver air from the cooling sleeve chamber 54 through sleeve radially inner wall 100 and into the chamber 62. That air is driven outwardly of an exit 58, where it also mixes with the products of combustion to drive the tip turbine for the propulsor as in the prior embodiment.

As shown in FIG. 2B and FIG. 3, inner housing 32 surrounds the components of the engine. A chamber 33 (or 62) is defined outwardly of inner housing 32 and inwardly of the cooling sleeve 28. The chamber 33 may contain engine accessories, such as controls, pumps, etc.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   an inner housing surrounding a compressor, a combustor, and a main turbine, with an inlet leading into said compressor, and
   a cooling sleeve chamber defined radially outwardly of said inlet to said compressor, said cooling sleeve chamber defined between a sleeve outer wall and a sleeve inner wall, said cooling sleeve chamber for receiving cooling air radially outward of said compressor inlet, said cooling sleeve chamber extending along a length of said engine, radially outwardly of said inner housing, said cooling sleeve chamber closed off at a downstream end,
   wherein said cooling air in said cooling sleeve chamber provides cooling air to at least one component in an inner chamber positioned radially between a radially outer surface on said inner housing and said sleeve inner wall, said inner chamber receives cooling air from said cooling sleeve chamber directed into said inner chamber through at least one conduit that extends through said sleeve inner wall,
   with said cooling air in said inner chamber mixing with products of combustion downstream of the main turbine that have passed from the combustor and over the main turbine and form a mixed air flow;
   wherein said mixed air flow drives a propulsor turbine for driving a propulsor positioned downstream of said main turbine;
   wherein said propulsor turbine is a tip turbine, with turbine blades being formed at an outer periphery of said propulsor, to be driven to rotate by the mixed air flow and, in turn, rotate the propulsor.

2. The gas turbine engine as set forth in claim 1, wherein an elongated inlet duct delivers air into said compressor inlet, and further delivers boundary layer air into a cooling sleeve inlet.

3. An aircraft comprising: an aircraft fuselage, and a gas turbine engine embedded in said fuselage,
   an inner housing surrounding a compressor, a combustor, and a main turbine, with an inlet leading into said compressor, and
   a cooling sleeve chamber defined radially outwardly of said inlet to said compressor, said cooling sleeve chamber defined between a sleeve outer wall and a sleeve inner wall, said cooling sleeve chamber for receiving cooling air radially outward of said compressor inlet, said cooling sleeve chamber extending along a length of said engine, radially outwardly of said inner housing, said cooling sleeve chamber closed off at a downstream end,
   wherein said cooling air in said cooling sleeve chamber provides cooling air to at least one component in an inner chamber positioned radially between a radially outer surface on said inner housing and said sleeve inner wall, said inner chamber receives cooling air from said cooling sleeve chamber directed into said inner chamber through at least one conduit that extends through said sleeve inner wall,
   with said cooling air in said inner chamber mixing with products of combustion downstream of the main turbine that have passed from the combustor and over the main turbine and form a mixed air flow;

wherein said mixed air flow drives a propulsor turbine for driving a propulsor positioned downstream of said main turbine;

wherein said propulsor turbine is a tip turbine, with turbine blades being formed at an outer periphery of said propulsor, to be driven to rotate by the mixed air flow and, in turn, rotate the propulsor.

4. The aircraft as set forth in claim 3, wherein an elongated inlet duct delivers air into said compressor inlet, and further delivers boundary layer air into a cooling sleeve inlet.

* * * * *